July 21, 1964    B. M. RANDALL    3,141,375
MISSILE HANDLING AND MATING SYSTEM
Filed March 2, 1962    11 Sheets-Sheet 1

FIG. 1a.

INVENTOR
BERT M. RANDALL
BY
B. L. Zangwill
ATTORNEY

July 21, 1964     B. M. RANDALL     3,141,375
MISSILE HANDLING AND MATING SYSTEM
Filed March 2, 1962     11 Sheets-Sheet 10

INVENTOR
BERT M. RANDALL
BY
ATTORNEY

INVENTOR
BERT M. RANDALL

United States Patent Office 3,141,375
Patented July 21, 1964

3,141,375
MISSILE HANDLING AND MATING SYSTEM
Bert M. Randall, Montgomery County, Md., assignor to the United States of America as represented by the Secretary of the Navy
Filed Mar. 2, 1962, Ser. No. 177,129
12 Claims. (Cl. 89—1)
(Granted under Title 35, U.S. Code (1952), sec. 266)

The invention described herein may be manufactured and used by or for the Government of the United States of America for governmental purposes without the payment of any royalties thereon or therefor.

This invention relates to handling systems and more particularly it relates to the type of handling system that is adapted for, but not limited to, marine applications. The handling system of the present invention is designed primarily for shipboard handling of missiles of the type employing a separable booster charge which assists in launching of the missile. The missile and booster components can be manufactured, shipped and stored separately; but for use, they are mated together, thereby forming an integral weapon of the guided missile type. The TALOS missile is a weapon which is assembled in the manner described hereinabove.

In accomplishing loading or replenishment at sea, the missile and booster components are transferred separately from an ammunition ship to the ship from which the guided missile is to be launched, generally a cruiser. Once aboard the cruiser, the missile and booster components must be lowered below the transfer level, mated together and delivered to ready service stowage. Previously, all of this handling was performed by manual means. Besides being inefficient and laborious, these manual means were extremely time-consuming and often resulted in a standard replenishment requiring several hours.

In an effort to overcome the aforementioned deficiencies, the present invention was developed. The system of the present invention is designed to receive a missile or booster every ninety seconds during replenishment. It mates the missile and booster and delivers the mated round to the ready service storage magazine at the rate of one complete round every six minutes per side, there being two systems (port and starboard), one on each side of the vessel, in the preferred embodiment. The system will operate at its rated speed under combined roll and pitch conditions of 15 degrees roll to port and starboard and return in a period of 12 seconds, and 4 degrees pitch up and down and return in a period of 8 seconds. The system components will hold, in the loaded condition, under combined roll and pitch of 25 degrees roll to port and starboard and return in a period of 12 seconds, and 4 degrees up and down and return in a period of 8 seconds. The system must also comply with general shock requirements required of United States naval vessels.

With the foregoing in mind, it is an object of the present invention to provide a high speed, mechanized missile handling system for use in marine conditions.

Another object of this invention is to provide positive transfer means for moving a missile and a booster separately to a mating station, mating the missile and the booster together and moving the mated round to a ready service storage magazine.

A further object of this invention is to provide a handling system which is as compact as possible, consistent with the function it must perform, but which will withstand the various physical conditions and effects to which it is exposed.

Still another object of this invention is to provide a system for handling and mating missile and booster components to form a unitary weapon, which system includes missile and booster carts which, respectively, retain the missile and booster components until they are mated, thereby eliminating all unnecessary handling steps during the mating operation.

Various other objects and advantages will appear from the following description of an embodiment of the invention, and the novel features will be particularly pointed out hereinafter in connection with the appended claims.

In the annexed drawings:

FIG. 8 is a side perspective view of a Booster Cart;

FIG. 8-A is a partial view of a booster, showing its auxiliary lower shoes locked by the booster cart retaining bars;

Figure 1A:
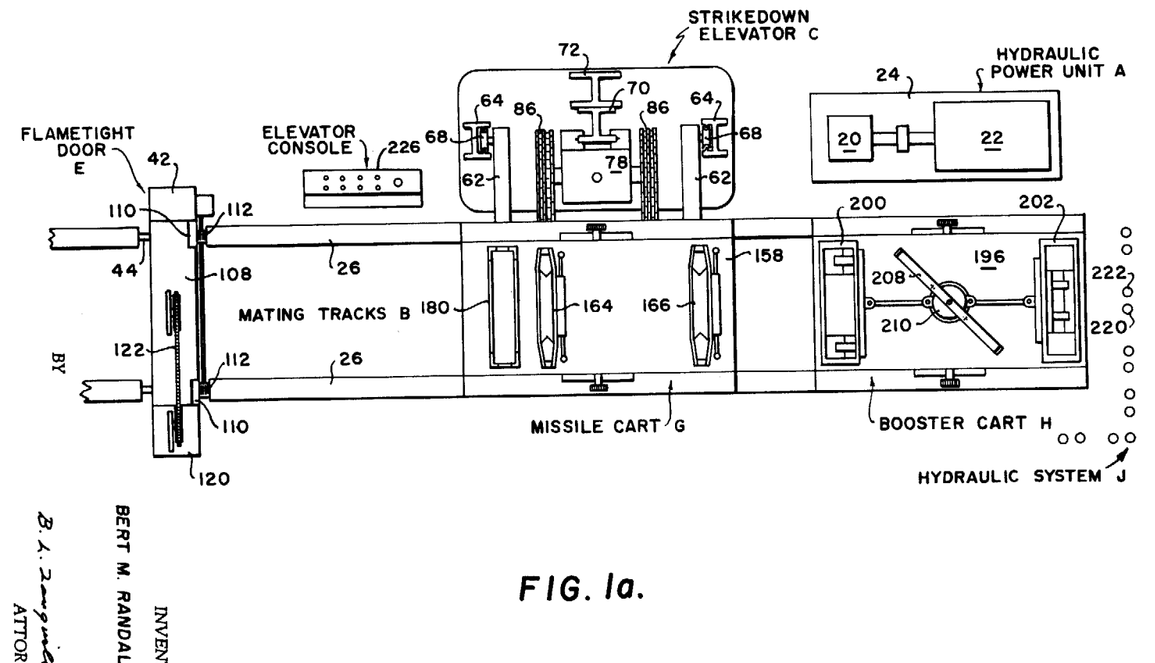
FIGS. 1A and 1B, when laid end to end and mated at the Flametight Door, are a top plan view of an embodiment of a missile handling system in accordance with the present invention.
Figure 1B:
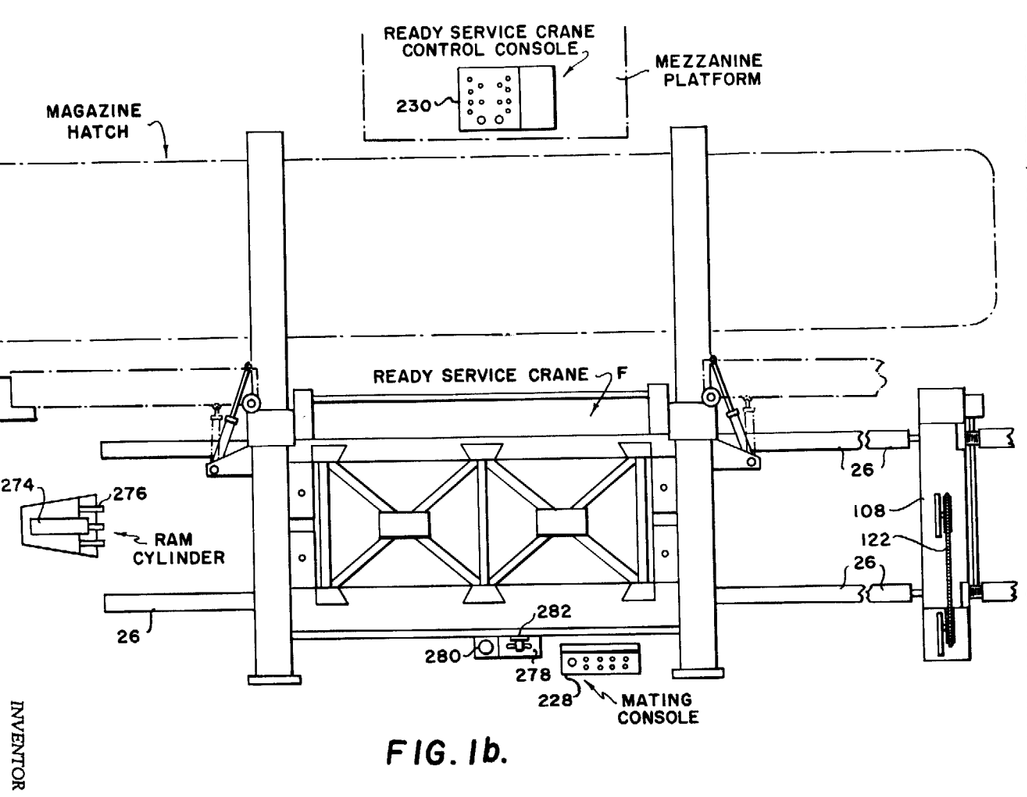

Referring now to FIGS. 1A and 1B, the handling system comprising the present invention can be seen to consist of several subsystems which are identified as follows:

Hydraulic Power Unit A
Handling and Mating Tracks B
Strikedown Elevator C
Strikedown Elevator Hatch D (FIG. 4)
Flametight Door E
Ready-Service Crane F
Missile Cart G
Booster Cart H
Hydraulic System J
Electrical Control System K (FIGS. 9–12)

Each of these subsystems will be described in detail hereinafter.

The system as herein described is capable of performing three operational cycles; namely, Strikedown, Strikeup and Checkout. The cycles can be summarized as follows:

Strikedown

The missile and booster are positioned in turn over the Strikedown Elevator Hatch D. The missile is transferred onto the Missile Cart G and is lowered to the main deck by the Strikedown Elevator C. Then it is moved on the Handling and Mating Tracks B to the mating station. The Booster Cart H is moved from its stowage position onto the Strikedown Elevator C and raised to the weather deck to receive the booster. The booster is then transferred onto the Booster Cart H and lowered to the main deck by the Strikedown Elevator C, whereupon it is moved on the Handling and Mating Tracks B to a position behind the missile. The missile and booster are then mated together to form a round which is lifted off the carts G and H by the Ready Service Crane F and carried inboard to a magazine tray where it is deposited. The round is then stored in the ready service magazine.

Strikeup

Strikeup is the reverse of Strikedown except the time requirements of the cycle are not critical. The mated round is hoisted out of the magazine tray by the Ready Service Crane F, carried outboard, and suspended over the Handling and Mating Tracks B at the mating station. The empty carts G and H are brought in from the Strikedown Elevator area to receive the round from the crane. The round is unmated and the missile and booster are each moved to the Elevator C and lifted to a higher level for offloading.

Checkout

This cycle is a combination of portions of the Strikedown and Strikeup cycles. The mated round is transferred from magazine to the Handling and Mating Tracks B and unmated, as in Strikeup. The booster alone is returned to the magazine and the checkout precodures are performed on the missile. On completion of the tests, the booster is brought back to the mating station and the two components are again mated. The mated round is then returned to the magazine, as in Strikedown.

Since Strikedown is the most critical of the three cycles, owing to the time requirements, it seems obvious that the system must be designed to conform with Strikedown requirements. Accordingly, the operation of the invention as recited later herein, is concerned with operation during the Strikedown cycle; however, it is to be understood that the system of the present invention is capable of performing the Strikeup and Checkout cycles as well as the Strikedown cycle.

Referring now to the details of the various subsystems of the present invention, FIG. 1A shows the Hydraulic Power Unit A comprised of a hydraulic pump 20 driven by an electric motor 22. The pump and motor are mounted on a reservoir 24 which contains hydraulic fluid to be delivered to the system under pressure. The unit is located on the main deck adjacent the Handling and Mating Tracks B near the booster cart stowage end.

In a specific embodiment of the Hydraulic Power Unit which has been constructed, the unit consists of a 65 gallon per minute, axial piston, hydraulic pump driven by a 75 horsepower, 440 volt, squirrel cage, alternating current, electric motor; both the motor and the pump being mounted ona 260 gallon reservoir. This specific unit delivers hydraulic fluid to the system at a pressure of approximately 1900 p.s.i., which is reduced to a system working pressure of 1500 p.s.i.

Figure 2:
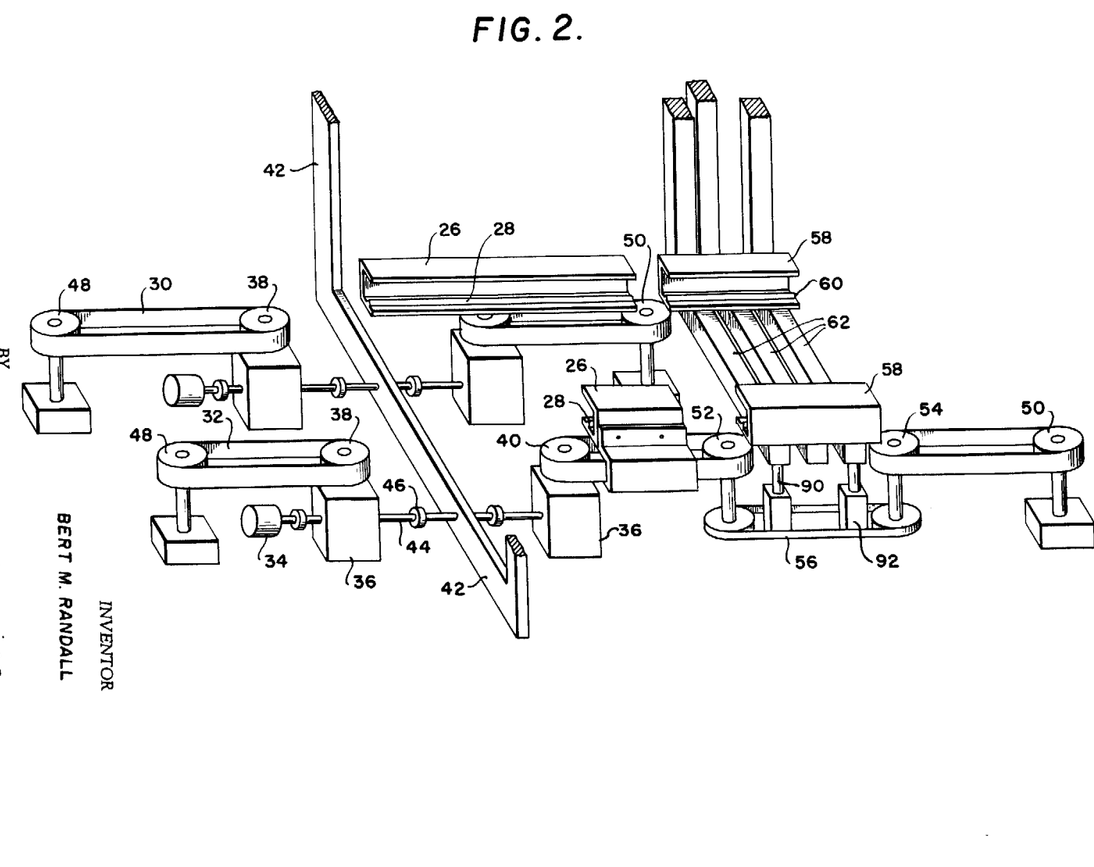
FIG. 2 is a side perspective view, and with parts broken away for clarity, partly in section, of a part of the embodiment comprising a Handling and Mating Tracks subsystem and a Strikedown Elevator located at its lowermost position.

Referring now to FIG. 2 which shows a detailed view of the Handling and Mating Tracks B, it can be seen the tracks consist of a pair of spaced U-shaped structural channels 26 each having an upstanding V-shaped rib 28 formed on its lower leg. The carts G and H traverse the system by wheels which ride upon the ribs 28. The carts are propelled by means of drive chains 30 and 32 which are equipped with side lug attachments and mounted below the tracks. Chain 30 drives the missile cart and chain 32 drives the booster cart. Each cart has a chain dog attached to it which is adapted to engage the chain for effecting transverse movement of the cart.

Chains 30 and 32 are driven by hydraulic motors 34 which operate the chains through speed reducers 36. The chain drive for each cart consists of more than one loop. The loops are mounted around drive sprockets and idler sprockets. Drive sprockets 38 and 40 are located on opposite sides of the bulkhead or frame 42 in which the Flametight Door E is mounted. Each hydraulic motor 34 drives sprockets 38 and 40 by means of a shaft 44 which interconnects the speed reducers 36. Flexible couplings 46 are provided on shaft 44 for the purpose of maintaining correct phasing of each drive chain loop. Each cart drive chain has a front idler sprocket 48 and a rear idler sprocket 50. The missile cart chain drive 30 terminates just before the Strikedown Elevator opening. However, since the booster cart stowage area is beyond the elevator opening, it is necessary that the booster chain drive 32 extend into that area. To accomplish this, dual sprocket idlers 52 and 54 are located on opposite sides of the elevator opening and a plain roller chain 56 interconnects the lower sprockets of these two idlers. It thus becomes apparent that the booster chain drive on the elevator side of the bulkhead 42 consists of the chain 32 connecting the drive sprocket 40 to the upper sprocket of dual idler 52, the chain 56 connecting the lower sprocket of dual idler 52 to the lower sprocket of dual idler 54, and the chain 32 connecting the upper sprocket of dual idler 54 to the rear idler sprocket 50.

Sprocket 54 is provided with a vernier adjustment to maintain correct phasing of the booster chain drive 32 on either side of the elevator opening.

Cams (not shown) are mounted on the various sprockets in a manner apparent to one skilled in the art so that the cart chain dogs are lifted out of engagement with the drive chain as the dogs move past the sprockets.

Figure 3:
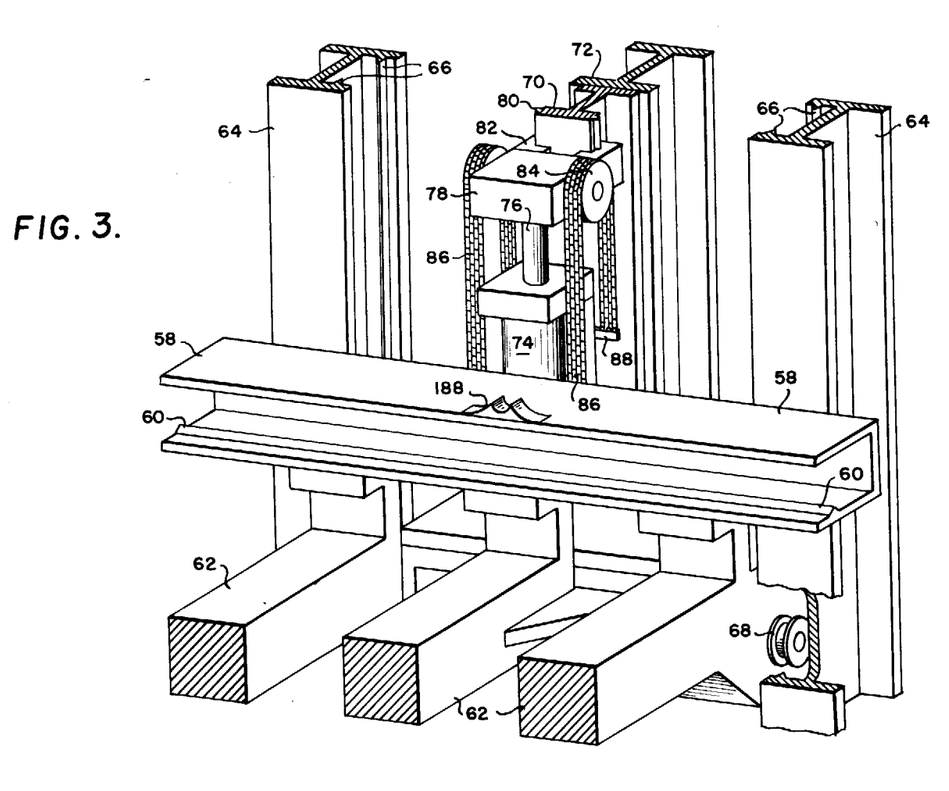
FIG. 3 is a side perspective view, partly in section, of the Strikedown Elevator and its related components.

The Strikedown Elevator Subsystem C can best be understood by reference to FIGS. 2 and 3 wherein an elevator platform is comprised of two spaced, parallel channels 58 which correspond in size to the channels 26 which form the tracks for the system. Each channel 58 has a rib 60 on its lower leg, corresponding in size to ribs 28 of channels 26. When the strikedown elevator is in its lowermost position, channels 58 coincide with channels 26 and ribs 60 correspond with ribs 28. The elevator platform channels 58 are mounted on three cross-members 62 which extend transversely between said channels.

The entire elevator platform is supported as a cantilevered member connected to two spaced, parallel, vertically upstanding beams or outer guide rails 64 which are located slightly beyond the outside of the outer members 62. Each guide rail has a pair of oppositely directed ribs 66 on its inner legs. The outer cross-members 62 have a grooved roller or wheel 68 mounted thereon, with the groove fitting between the ribs 66.

For hoisting the strikedown elevator, a center guide rail 70 is provided which is fastened to and supported by a channel 72. A hydraulic hoisting cylinder 74 is located between the strikedown elevator platform and the center guide rail 70. The piston rod 76 for the cylinder 74 has its upper end terminating in a crosshead 78. The leg of the center guide rail 70 which is adjacent the crosshead has runners 80 formed on its outer edges. Two grooved guide members 82 are fastened to the rear of the crosshead 78 and are fitted over the runners 80 so that they will ride up and down the runners as the piston rod 76 is reciprocated. Two sheaves 84 are mounted on the lateral ends of the crosshead 78. A hoisting chain 86, of the flat belt multi-link type, is mounted over each sheave and is connected at one end to a terminal 88 on the center guide rail 70 and at its other end to a similar terminal 89 (FIG. 4) on the rear of the strikedown elevator channel 58.

In operation, the strikedown elevator is raised and lowered by means of hydraulic power supplied to the cylinder 74. As hydraulic fluid enters the cylinder, the piston rod 76 and crosshead 78 move upward. The hoisting chain and sheave arrangement provides for two feet of platform travel for each foot of hydraulic cylinder piston travel. As the elevator platform moves upward, guide members 82 move along the runners 80 and wheels 68 move along the ribs 66. Lowering of the elevator platform is accomplished by releasing hydraulic fluid from the cylinder 74. When the elevator reaches its lowermost position in the enclosed area of the ship (FIG. 2), snubbers 90 on the bottom of the outer two crossmembers 62 settle into cavities in snubber receiving members 92.

Figure 4:
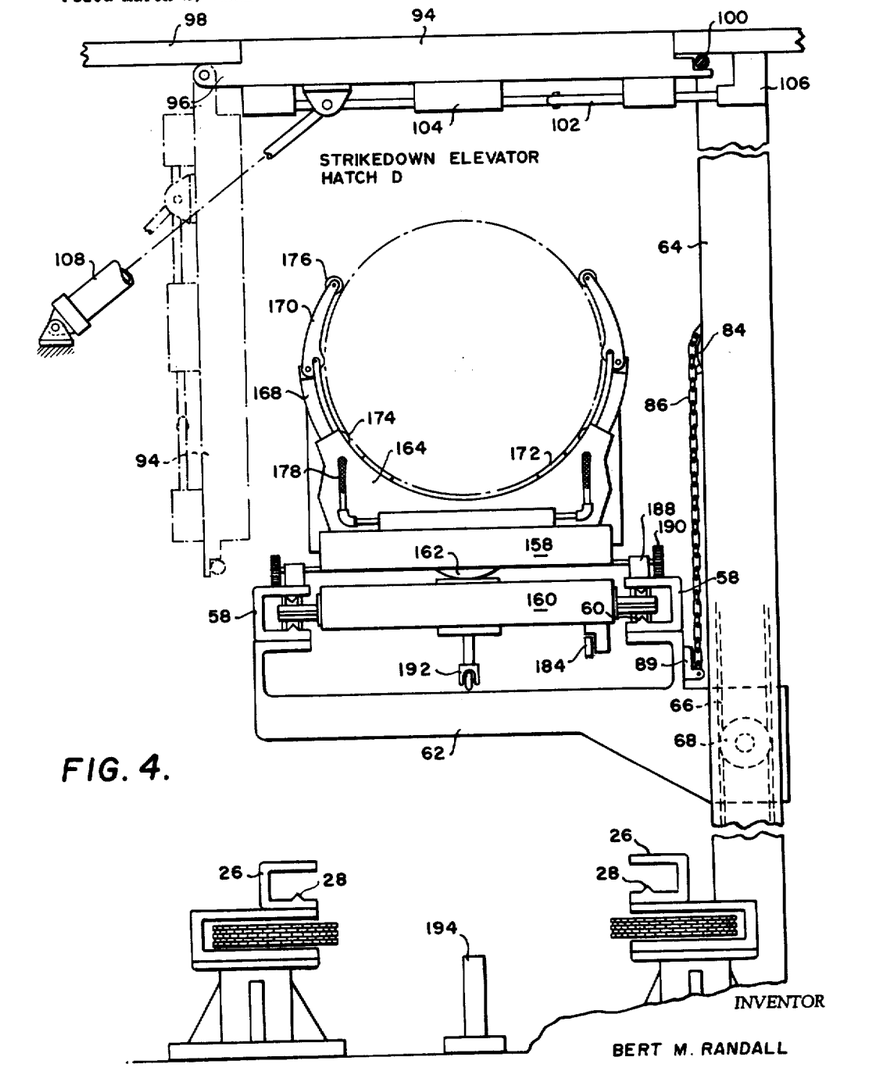
FIG. 4 is an end view of the system, looking in a direction from the booster stowage end towards the mating area.

The Strikedown Elevator Hatch D, as seen in its closed position in FIG. 4, consists of a door or hatch 94 hinged at 96 to the exposed upper or weather deck 98. A hydraulic gasket 100 on the outer edge of the hatch bears against the under surface of the weather deck 98 and thus forms a seal when the hatch is closed. As the drawing illustrates, when the hatch 94 is in its closed position, it forms a flush surface with the weather deck 98. The hatch is maintained in its closed position by means of dogging bars 102, eight of which are mounted on the undersurface of the hatch 94. The dogging bars are actuated by means of hydraulic cylinders 104, two of which are mounted on the undersurface of the hatch 94 along with the dogging bars. Upon actuation of the hydraulic cylinders 104, the dogging bars 102 are moved laterally into recesses in a depending member 106, thereby locking the hatch 94 in its closed position. The hatch is swung through the arc from its closed position to its open position (shown in dotted lines in FIG. 4) by means of three hydraulic actuating cylinders 108, pivotally mounted at each of their ends.

Figure 5:
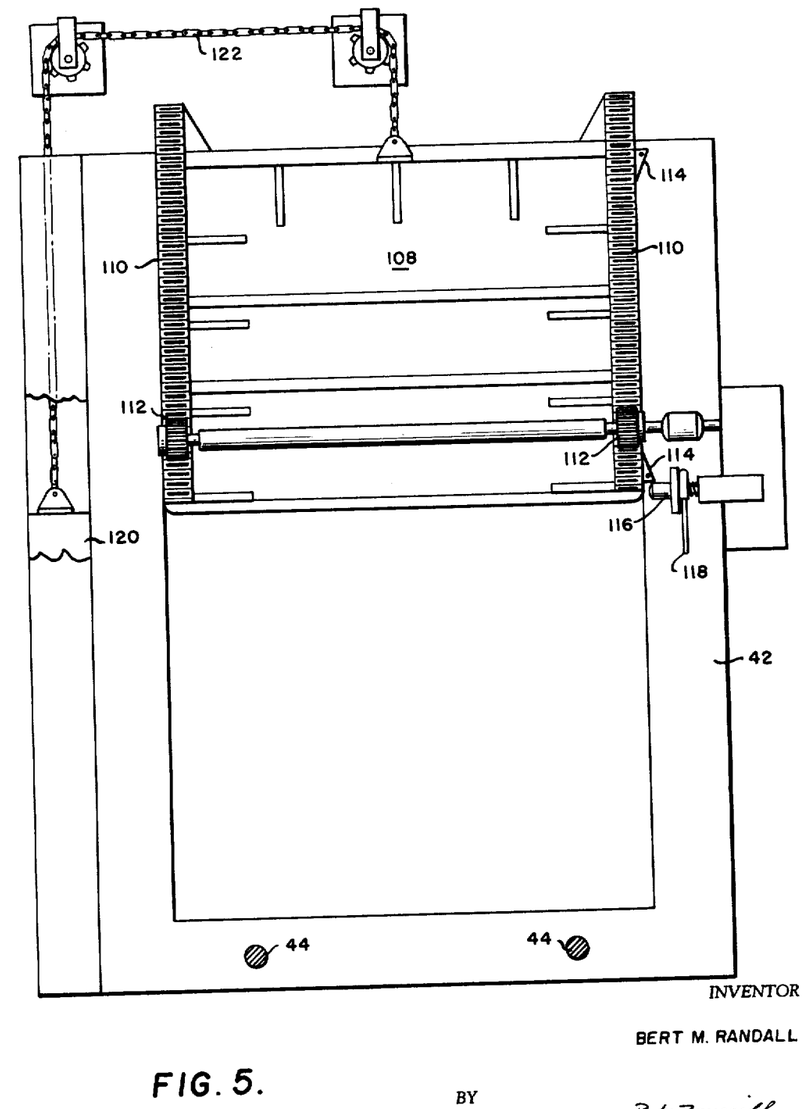
FIG. 5 is a front plan view of the Flametight Door, looking in a direction from the Strikedown Elevator towards the mating area.

Referring now to FIG. 5, the Flametight Door Subsystem E is shown wherein a door panel 108 is mounted to reciprocate vertically within the frame or bulkhead 42. As FIGS. 1A, 1B and 2 illustrate, this door is located between the Strikedown Elevator C and the mating area. Racks 110 are provided on the lateral edges of the door 108 and hydraulically operated interconnected pinions 112 mate with said racks to raise and lower the door upon reception of the required signal from the operator. Cams 114 are provided on one edge of the door panel 108 to mate with a hydraulic plunger 116 and thereby latch said door panel at both its open and closed positions. A manually operated lever 118 is provided in the hydraulic plunger to permit the door to be unlatched for emergency manual operation. A counterweight 120 is connected to the top of the door panel 108 by means of a roller chain 122. This counterweight serves as a fail-safe device since it prevents the door 108 from dropping to its closed position in case of mechanical failure of the pinion drive shaft. The Flametight Door Subsystem E is provided with electrical interlocks to prevent the door 108 and the magazine door from being open at the same time during normal operation of the system.

Figure 6:
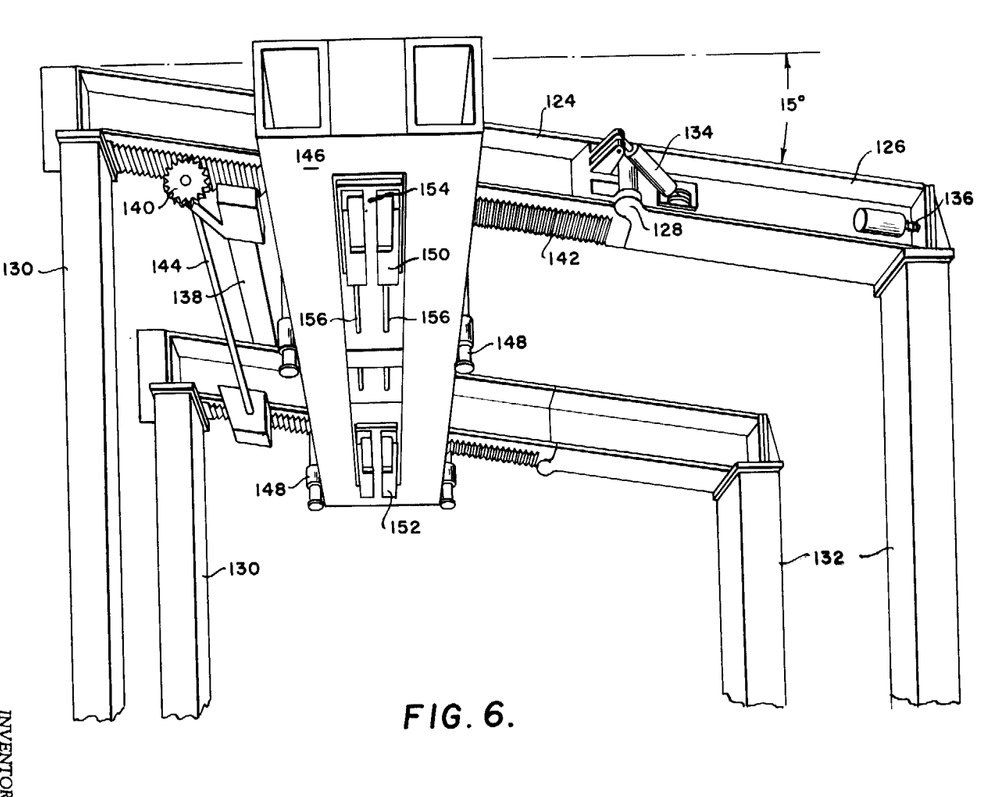
FIG. 6 is an end perspective view of a Ready Service Crane and some of its related components included in the embodiment.

Referring now to FIG. 6, the Ready Service Crane F can be seen to consist of rails, a crane bridge, a strongback and shoe grips. The rails are a pair of transverse track members, which slope downward at an angle of approximately fifteen degrees, and comprise a fixed rail section 124 and a movable or pivotable rail section 126 hinged at 128 to the fixed section. The rails extend across the mating station for the purpose of allowing the crane to move a mated round between the Handling and Mating Tracks and the ready service stowage magazine. The fixed rails 124 are attached to support members 130. The movable rails 126 rest at their ends on support members 132, the tops of which are sufficiently lower than the tops of members 130 to enable the tracks to slope downward at a fifteen degree angle. A hydraulic cylinder 134 is mounted at the hinge point 128 on each set of rails to pivot the movable rails 126 from their "Ready" position as shown in FIG. 6 to their "Stow" position, as shown in dotted lines in FIG. 1B. Each movable rail 126 has a cylinder actuated plunger 136 at its free end for the purpose of locking the rail in its "Ready" and "Stow" positions.

The crane bridge 138 is a welded steel framework which is supported over the fixed rails 124 and is movable transversely across these fixed rails by means of V-groove wheels 140 which travel in V-grooves 142 on the lower surface of said fixed rails. The wheels 140 are interconnected by an equalizer shaft 144, and motion is imparted to said wheels by means of hydraulic power supplied from traverse cylinders mounted upon the fixed rails 124.

A strongback 146 is suspended from the crane bridge 138 by means of two hydraulic hoisting cylinders (not shown). The strongback is maintained parallel to the handling tracks 26 and is moved vertically upon four guide rods 148 which depend from the underside of the bridge 138.

Shoe grips consisting of a front shoe grip 150 and a rear shoe grip 152 depend from plates 154 which are mounted adjacent lower surface of the strongback 146. The shoe grips provide clamping mechanisms which can capture the front and rear launching shoes on the booster and thereupon lift the same, either singly or as a mated round. Reach rods 156 extend between each shoe grip and two tandem hydraulic cylinders so that when the cylinders are selectively actuated, the shoe grips move longitudinally to engage or disengage the launching shoes on the booster.

Figure 7:
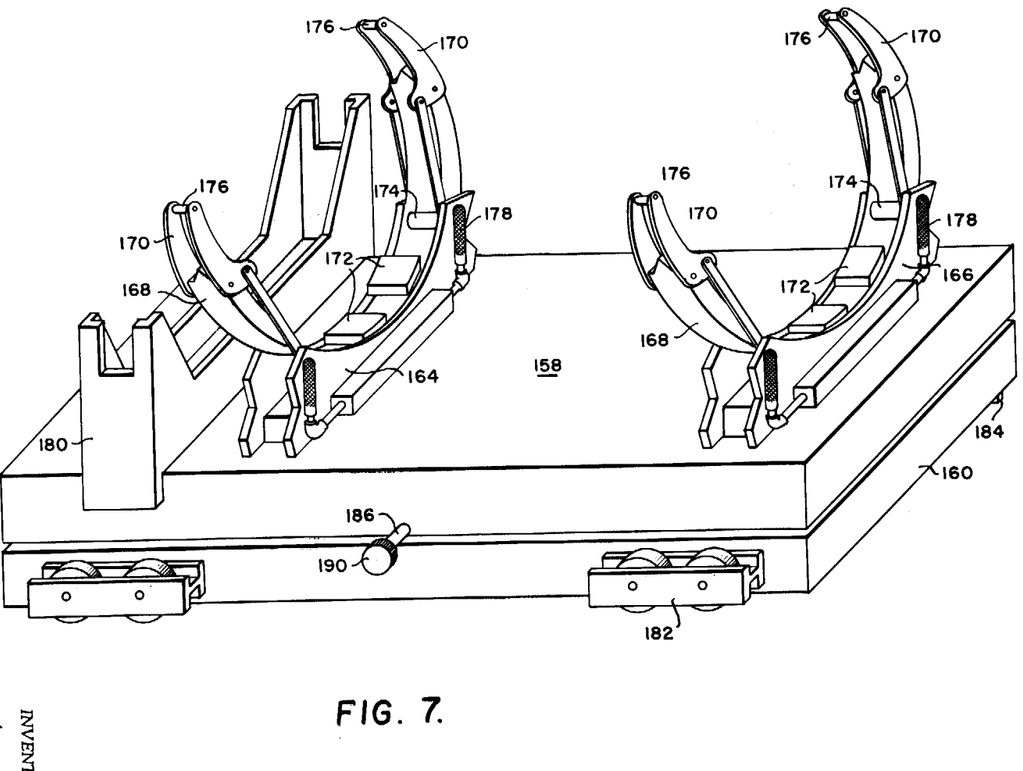
FIG. 7 is a side perspective view of the Missile Cart.

FIG. 7 is a view showing some of the details of the Missile Cart subsystem G. The cart body consists of an upper frame 158 and a lower frame 160, attached together by means of four spherical bearing assemblies 162 (see FIG. 4) which allow the upper frame to "float" on the lower frame. Two supporting saddles 164 and 166 are mounted on the upper surface of the upper frame 158. Each saddle includes a lower roll ring half 168 to which clamp arms 170 are attached. Missile support pads 172 are mounted on the interior of the ring half 168 to provide a surface for the missile to rest upon. Lower rollers 174 are mounted in the ring half 168 and upper rollers are mounted at the ends of the clamp arms 170 to permit the missile to be rotated 360 degrees around its longitudinal axis during checkout (at which time an upper roll ring half is attached to the lower half). Hand operated unlocking levers 178 at the rear of each saddle are used to unlock the clamp arms 170. A steady rest 180 is mounted forward of the front saddle 164.

The lower frame 160 has two pairs of double grooved wheels 182 mounted on each of its sides to permit the missile cart to roll along the tracks. The grooves in each wheel are adapted to ride on ribs 28 and 60.

Three spring loaded chain dogs 184 (see FIG. 4) are mounted on the under surface of the lower frame 160 and are located at the ends and middle of the cart on the side where the missile drive chain 30 is located, so that at least one dog is engaged with the drive chain 30 at all points of travel.

A spring loaded locking bar 186 projects beyond both sides of the cart frame to engage cart locks 188 on the elevator channels 58, and thereby lock the cart against movement while on the elevator. Wheels 190 are provided on each end of the locking bar 186 for permitting rolling movement along the upper surface of the elevator channels 58.

As FIG. 4 illustrates, a locking bar operating wheel 192 extends downward from the bottom of the lower frame. When the elevator reaches its lowermost position, the wheel 192 contacts a release member 194 which is mounted beneath the elevator, and which moves the locking bar 186 upward to release it from the card locks 188.

Figures 8, 8A:
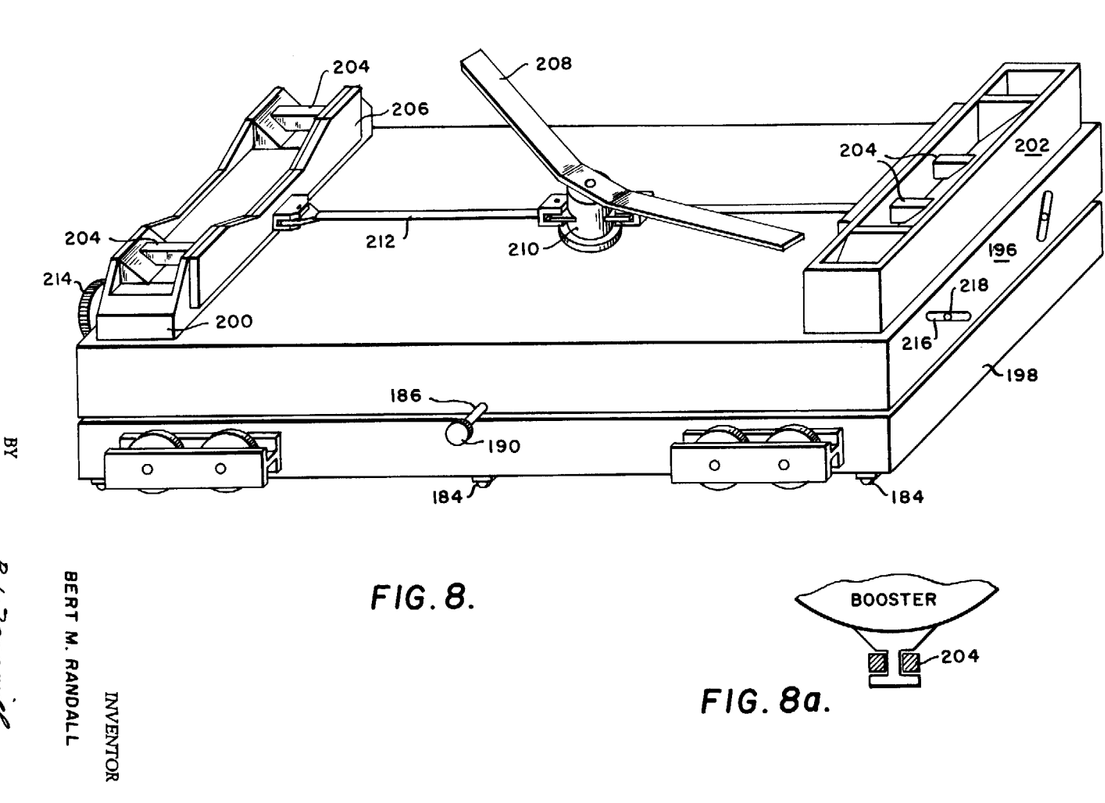

Referring now to FIG. 8, the Booster Cart H is shown to include an upper frame 196 and a lower frame 198 interconnected by spherical bearing assemblies in a manner similar to that of the missile cart frames 158 and 160. Mounted on the upper surface of the upper frame 196 are a forward shoe receptacle 200 and an aft shoe receptacle 202 which are designed to hold the auxiliary lower shoes of a booster (FIG. 8–A) in contact with the booster cart. To accomplish this holding, retaining bars 204 fixed to a plate 206 are adapted to be slid into and out of the shoe receptacles. FIG. 8 shows the retaining bars in the locked position and FIG. 8–A shows how said bars engage the booster shoes to lock the booster onto the Booster Cart. The plates 206 and their attached retaining bars 204 are moved between locked and unlocked positions by means of a manually operated locking lever 208 which is mounted on a rotary member 210. The rotary member 210 universally connects to the plates 206 by means of shafts 212, whereupon when the lever 208 is rotated, a longitudinal movement is imparted to said plates 206 causing them to slide the retaining bars 204 into or out of locked positions.

The upper frame 196 is provided with a manually operated roll mechanism 214 which allows the upper frame to be rolled or rotated approximately five degrees around its longitudinal axis in either direction to facilitate mating the missile and the booster. Slots 216 having roll wheels 218 therein, allow such motion to occur. A pointer and a calibrated plate (not shown) are provided to indicate a zero roll position.

The booster cart is provided with a locking bar and operating wheel identical to that of the missile cart. Also its wheels are identical to wheels 182 of the missile cart. Chain dogs 184 depend from the bottom of lower frame 198 in a manner similar to that described for the missile cart; however, the booster cart chain dogs are on the opposite side of the frame so that they can engage the booster drive chain 32.

The Hydraulic System J consists of twenty-eight separate hydraulic circuits connected by steel tubing and flexible hydraulic hose in a manner apparent to those skilled in the art. Each circuit consists of hydraulic cylinders or a hydraulic motor with the required solenoid-operated 4-way valves, pressure cutoff valves, flow control valves and check valves. The system uses suitable fire resistant hydraulic fluid which is supplied under pressure by the Hydraulic Power Unit A.

Six accumulators 220 and air bottles 222 (FIG. 1A), connected in parallel with the hydraulic pump 20 discharge, provide a reserve supply of hydraulic fluid under pressure to maintain operating speed during periods of peak consumption. The accumulators 220 also allow completion of the operation in progress if the Hydraulic Power Unit A fails.

A separate emergency circuit (not shown), consisting of hand operated pumps and required cutoff valves, supplies emergency power to stow the Ready Service Crane F in the event of power failure. The handpumps are supplied directly from a reserve supply tank.

The Electrical Control System K is supplied from a suitable power source, the ships service 115-volt, A.C. power supply, in the preferred embodiment of the invention, and consists of automatic limit switches and relays, and manually operated rotary and push button switches. The limit switches are incorporated into the system components to energize or de-energize the solenoid operated valves that control the movements of the system components. The manually operated switches are grouped at four control stations; namely the Topside Control Station 224, the Elevator Console 226, the Mating Console 228 and the Crane Console 230. Each of these control stations are described in detail hereinafter.

Figure 9:
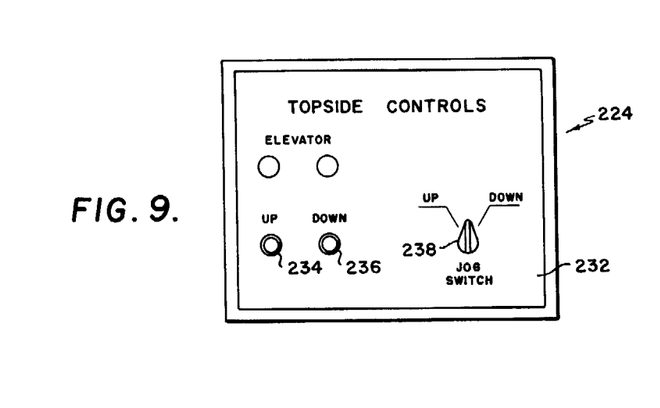
FIG. 9 is a front plan view of a Topside Control Station.

The Topside Control Station 224, as seen in FIG. 9, consists of three switches which are shown mounted on a panel 232. It is possible, however, to mount the switches directly on the outboard bulkhead and eliminate the panel 232. The switches 234 and 236 are momentary contact push button units and are used respectively to control the up and down travel of the Strikedown Elevator C. The switches 234 and 236 are equipped with indicating lights which operate in conjunction with lights on the Elevator Console 226. The third switch 238 is a two position jog switch which allows the topside operator to inch the Elevator up and down approximately six inches above its regular travel to facilitate loading and unloading.

Figure 10:
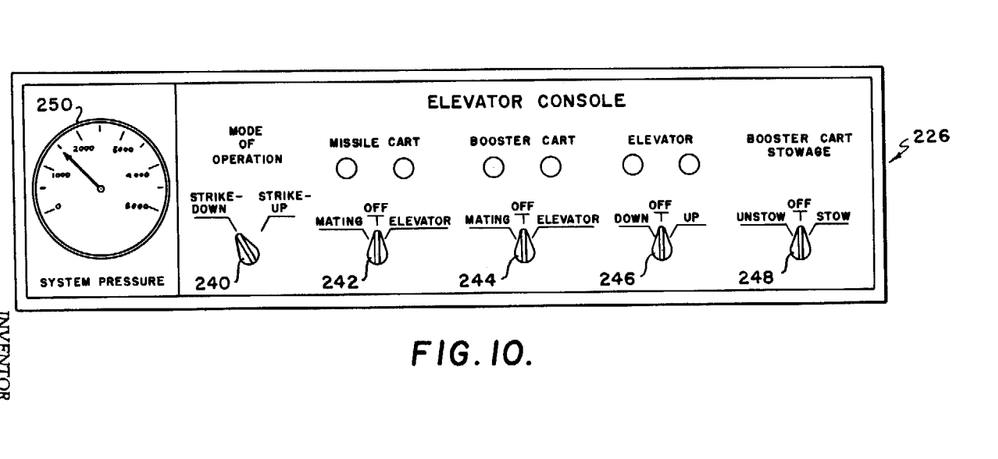
FIG. 10 is a front plan view of an Elevator Console.

The Elevator Console 226, as shown in FIG. 10, consists of five control switches, indicating lights therefor, and a system pressure gage. The Console 226 is mounted on the main deck adjacent the Handling Tracks and Strike-down Elevator (FIG. 1A). One of the control switches 240 is a mode of operation switch, having two positions; strikedown and strikeup. The other four switches are three-position, spring return to center, rotary switches. The switch 242 controls movement of the missile cart between the elevator and the mating area. The switch 244 controls similar movement of the booster cart. The movements controlled by the switches 242 and 244 are controlled in conjunction with the Mating Console 228. The switch 246, in conjunction with switches 234 and 236 of the Topside Control Station, controls up and down travel of the Strikedown Elevator. The switches 242, 244 and 246 have indicator lights above them, which lights are energized by switch actuation at another control station, to serve as command signals during operations. The switch 248 is an independent control used for stowing and unstowing the booster cart. Since the missile cart is stowed on the Strikedown Elevator, no separate switch is needed to control its movement, since the switch 242 accomplishes this purpose. A gage 250 on the console indicates the system hydraulic pressure.

Figures 11, 12:
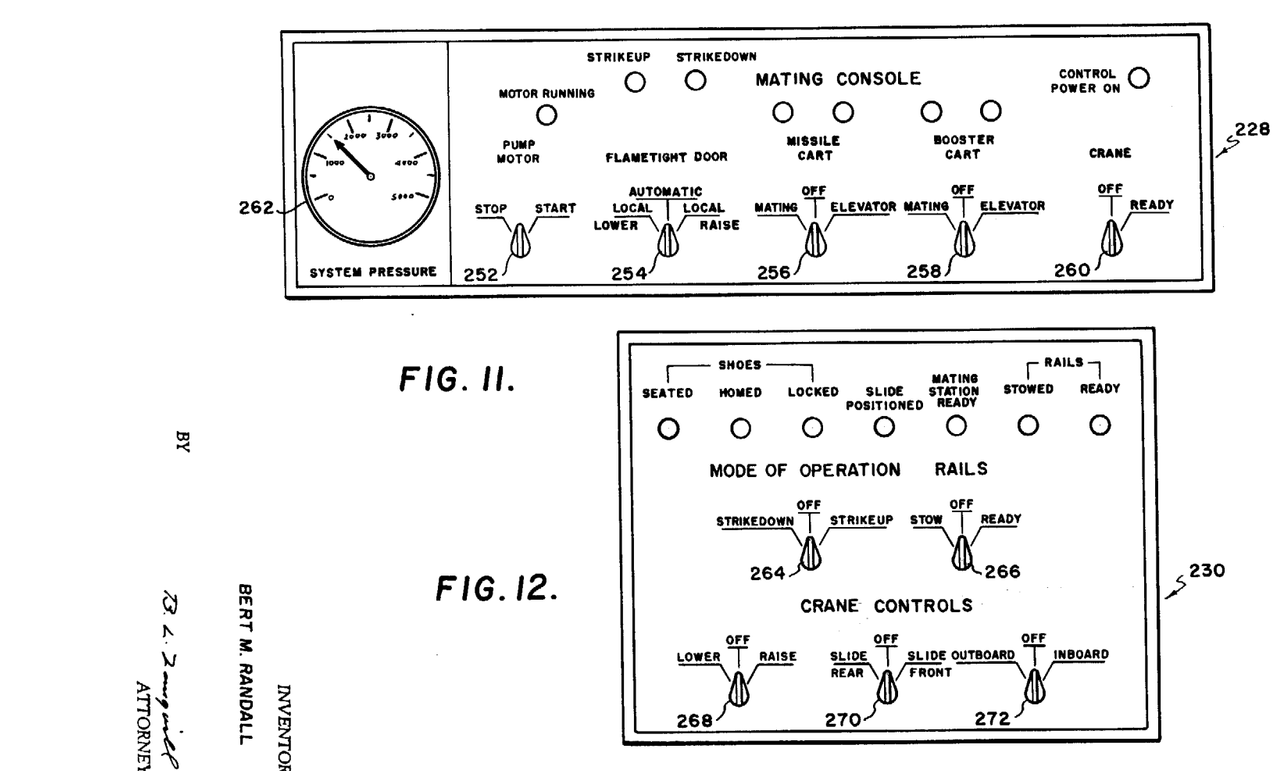
FIG. 11 is a front plan view of a Mating Console.
FIG. 12 is a front plan view of a Crane Console included in the invention.

The Mating Console 228, as shown in FIG. 11, consists of five control switches, indicating lights therefor and a system pressure gage. The Console 228 is mounted on the main deck adjacent the Handling Tracks at the mating area (FIG. 1B). The switches are all spring-return-to-center type and as with the other control stations, the switch position markings indicate the direction of travel. The pump motor switch 252 controls the pump 20 of the Hydraulic Power Unit. The flametight door switch 254 is used to operate the flametight door only during Strikeup and Checkout. The missile cart switch 256 and the booster cart switch 258 are operated in conjunction with the switches 242 and 244 on the Elevator Console to control movement of the respective carts. The crane switch 260 is used to signal the operator of the Crane Console 230 and is required to start movement of the Crane Strongback. A gage 262, similar to gage 250 on the Elevator Console, indicates the system hydraulic pressure.

The Crane Console 230, as shown in FIG. 12, consists of five control switches and indicating lights therefor. The Console 230 is mounted on the mezzanine platform adjacent the mating area (FIG. 1B). The switches are all spring-return-to-center, with the exception of the mode of operation switch 264 which is moved to the position indicating the desired operation and the rails switch 266 which determines the position of the movable rails 126. A switch 268 controls raising and lowering of the crane strongback 146. A switch 270 controls sliding movement of the crane shoes 150 and 152. A switch 272 is used to move the Ready Service Crane between its "outward" position over the mating station and its "inboard" position over the magazine hatch.

In addition to the aforementioned subsystems and their related components, certain other miscellaneous system subcomponents are included to comprise the entire system. A ram cylinder assembly as shown in FIG. 1B, consists of a ram or mating cylinder 274 and buffer cylinders 276 for stopping the missile cart. Operation of the ram cylinder 274 is controlled by the ram control handle 278, also shown in FIG. 1B. This handle has three positions; "mate," "unmate" and neutral. The ram cylinder 274 is operated by a hydraulic power source independent of the main hydraulic power unit. A pressure gage 280 gives the system pressure for the ram cylinder hydraulic system. A tram assembly 282 is mounted on top of the ram control bracket to check alignment of the missile and booster components during mating thereof.

*Operation*

As was recited earlier, Strikedown is the most critical mode of operation because of the time requirements involved. Thus, since the system is designed to comply with Strikedown cycle requirements, the operation set forth hereinafter will be the operation during Strikedown.

Prior to starting the strikedown operations, the Missile Cart G is locked in its stowed position on the Strikedown Elevator C and the Booster Cart H is locked in its stowage area, the position illustrated in FIG. 1A. The operator of the Elevator Console 226 checks the carts to make sure that the missile clamp arms 170 on the Missile Cart G and the booster shoe-locks 200, 202, 204 on the Booster Cart H are in the full open position.

The hydraulic pump motor 22 is started by turning the motor switch 252 on the Mating Console 228 to "START" and holding it there until the "MOTOR RUNNING" indicator light glows. Proper pressurization of the system is indicated by the gage 262 on the Mating Console. The operator of the Crane Console 230 turns the mode of operation switch 264 to "STRIKE DOWN" and turns and holds the rails switch 266 to "READY." The movable rails 126 of the Ready Service Crane F unlatch from their stowage brackets (shown in FIG. 1B) and swing inwardly toward the support members 132, locking on them in the ready position. When these preparations are complete, the strikedown operations may begin.

The operator of the Elevator Console 226 turns and holds the elevator switch 246 to "UP." At the same time, the topside operator pushes and holds the "UP" button 234. A loaded missile transfer dolly, or other suitable conventional means of moving the missile across the weather deck, waits straddled over the Strikedown Elevator Hatch 94. As shown in FIG. 4, the hatch 94 swings downward to its open position, thereby actuating limit switches, one of which opens a set of locks (not shown) which lock the Strikedown Elevator in its lowermost position, and the other of which actuates the elevator hoisting cylinder 74 causing the piston rod 76 to move upward, thereby moving the Strikedown Elevator C, with the missile Cart G aboard it, upward to the weather deck to receive the missile. After the Elevator stops at the end of its "Normal" upward travel, the topside operator has control of its further upward movement by means of the jog switch 238. With this switch, the operator "inches" the Elevator upward until the missile makes contact with the missile support pads 172 on the inner curvature of the roll rings 168. When such contact is made, further upward jogging will cause the missile clamp arms 170 to clamp into position and secure the missile.

The flexible bands on the dolly, which were used to support the missile, are released and the Elevator is then ready for downward movement. The topside operator pushes the "Down" button 236 and the Elevator Console operator turns and holds the elevator switch 246 to "Down." At this moment, a holding relay in the Flametight Door E electrical circuit is energized, and the door 108 opens. The elevator platform, with the loaded missile cart thereon, descends to its lowermost position where its tracks 58, 60 become aligned with the handling tracks 26, 28. When the elevator reaches its lowermost position, the chain dogs 184 on the Missile Cart automatically engage the missile chain 30 and the operating wheel 192 automatically releases the locking bar 186, thereby freeing the missile cart from the Strikedown Elevator.

At this point, the Elevator Console operator turns and holds the missile cart switch 242 to "MATING," thus lighting the indicating lamp on the Mating Console 228. Upon receiving the signal, the Mating Console operator turns and holds the missile cart switch 256 to "MATING," thus lighting the indicating lamp on the Elevator Console 226 and starting operation of the missile cart drive chain 30. This causes the loaded Missile Cart to move through the Flametight Door opening and into the mating area. A few inches before the Missile Cart reaches the end of its travel to the mating station, the front end of the cart frame contacts the two hydraulic buffer cylinders 276 mounted on the ram cylinder assembly, thereby reducing the momentum of the cart. When the Missile Cart reaches the end of its travel, a clevis pin mounted on the cart frame engages a hook on the end of the piston rod of the ram cylinder 274, thereby releasing the chain dogs from the chain drive. This permits freedom of movement of the loaded Missile Cart for mating.

As the loaded Missile Cart passes through the Flametight Door opening, thus leaving the Elevator tracks clear, the Elevator Console operator, while still holding the missile cart switch 242 to "MATING," turns and holds the booster cart stowage switch 248 to "UNSTOW." This unlocks the Booster Cart H from its stowage position and energizes the booster cart chain drive motor 34 to move the cart onto the Strikedown Elevator. Meanwhile, the topside personnel have positioned a booster transfer dolly straddled over the Elevator Hatch D. The topside controls operator pushes "UP" button 234 and the Elevator Console operator turns and holds switch 246 to "UP." The Strikedown Elevator, with the Booster Cart locked thereon, proceeds upward to topside as the hatch door 94 swings downward to its open vertical position. After the Strikedown Elevator stops at the end of its normal travel, the topside operator again has control of further upward movement by means of the jog switch 238. Using this switch, the operator "inches" the elevator upward until the shoes on the underside of the booster enter the shoe receptacles 200, 202 on the Booster Cart H. When the shoes are seated, and the Booster Cart is supporting the entire weight of the booster, the topside personnel move the locking lever 208 to the locked position, thereby moving the retaining bars 204 into their locked position to lock the booster shoes within the receptacle. The lower flexible transfer bands of the booster dolly are released, the "Down" button 236 is pushed, the switch 246 is held to "Down," and the Strikedown Elevator C, with the loaded Booster Cart H locked thereon, descends to its lowermost position. At the same time, the hatch 94 swings closed and the dogging bars 102 lock it in its closed position.

When the elevator reaches its lowermost position, the chain dogs 184 on the Booster Cart automatically engage the booster chain 32 and the operating wheel 192 automatically releases the locking bar 186, thereby freeing the Booster Cart from the Strikedown Elevator. The Elevator Console operator turns the Booster Cart switch 244 to "MATING," thus lighting the indicating lamp on Mating Console 228. Upon receiving this signal, the Mating Console operator turns and holds the booster cart switch 258 to "MATING," thus lighting the indicating lamp on the Elevator Console 226 and starting operation of the booster cart chain drive 32 which moves the loaded Booster Cart from its position on the Strikedown Elevator to its mating station position. When the loaded Booster Cart arrives at its mating station position beneath the Ready Service Crane, it is locked therein in the manner as it is locked on the Strikedown Elevator.

Because of the lead-in provided on the weapon mating surfaces, and because the Carts G and H are designed to carry their components in the correct "launch attitude," the mating operation is normally performed with little, if any, adjustment. However, if adjustment must be made, the Missile Cart G is provided with three manually operated mechanisms (not shown), referred to as roll, pitch and yaw controls, which can correct a misalignment between the mating surfaces of ¾ inch in any direction. The Booster Cart H is provided with a single adjustment, roll mechanism 214, which can roll the booster component up to five degrees to either side of the neutral axis. The tram assembly 282 is used to check alignment of the missile and booster components.

To mate the missile and booster components, the ram control mating handle 278 is moved to "MATE," thus causing the ram cylinder 274 to back the missile into the booster. When the components are mated, the contracting bolt on the booster clamp ring is tightened with a torque wrench, thus locking the missile and the booster in their mated positions and thereby forming one mated round.

The operator of the Crane Console 230 turns and holds the switch 268 to "LOWER," thus causing the Ready Service Crane strongback 146 to descend. As it descends, the shoe-grip slide mechanism is automatically unlatched and the shoe grips 150 and 152 slide "FRONT," that is, toward the nose of the missile, and lower to the "SHOE SEATED" position. When the strongback 146 has descended to the proper level, the operator turns and holds the slide switch 270 to "SLIDE REAR." The shoe grips 150 and 152 slide toward the rear of the booster, thereby engaging and locking the booster upper shoes. Since the mated round is now locked to the strongback 146, the weapon is released from the carts by manually operating unlocking levers 178 on the Missile Cart to release the clamp arms 170 and by manually moving the lever 208 on the Booster Cart to unlocked position, thereby retracting the booster shoe retaining bars 204.

The operator of the Mating Console 228 now turns and holds the switch 260 to "READY." When the "MATING STATION READY" indicating light glows on the Crane Console 230, the crane operator turns the raise-lower switch 268 to "RAISE," thus causing the strongback 146 to lift the mated round off the carts G and H.

The mating handle 278 is now moved to "UNMATE," thus retracting the ram cylinder 274 and returning the Missile Cart to the end of the mating tracks. The Mating Console operator now turns and holds the missile and booster cart switches, 256 and 258, to "ELEVATOR." This disengages the ram cylinder 274 from the Missile Cart, engages the chain dogs 184 with their respective drive chains and lights the indicating lights and the Elevator Console 226. This notifies the operator of the Elevator Console to turn the cart switches 242 and 244 to "ELEVATOR," thus lighting the indicating lights on the Mating Console 228. Both carts G and H move from the mating station toward the elevator area. The Booster Cart H passes beyond the elevator to its stowage position, because the cart's locking bar is automatically held out of engagement with the cart lock on the elevator tracks. The Booster Cart H moves to and locks in its stowage position and the Missile Cart G moves to and locks in its stowage position on the Strikedown Elevator C. When the Missile Cart locks onto the Strikedown Elevator, a cam on the underside of the cart trips a switch which energizes the flametight door mechinery, thus causing the plunger 116 to withdraw and allow the Flametight Door E to close.

The Crane Console operator now turns and holds the switch 272 to "INBOARD," thus causing the Ready Service Crane strongback 146 to traverse, with the mated round, to its "inboard up" position which is directly above the magazine hatch (shown in FIG. 1B). The operator holds the switch 268 to "LOWER," thus lowering the mated round into the magazine. The switch 270 is held to "SLIDE FRONT," thus disengaging the weapon or mated round from the crane, and the switch 268 is turned and held to "RAISE" thus lifting the strongback to its "inboard up position. The switch 272 is held to "OUTBOARD" to return the strongback to its position over the mating station.

At this point, the system is ready to begin another operation. The operation, as set forth hereinabove, is repeated until the last weapon is stowed in the magazine. When the last weapon is stowed, the rails switch is turned to "STOW" and the movable rails 126 unlatch and move to the stowage brackets where they relatch, thus completing the strikedown operations.

It should be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A system for receiving, handling, mating and stowing weapons of the type having at least two discrete components to be mated into a unitary weapon, said discrete components being initially received at an essentially exposed area and being handled, mated and stowed in an essentially enclosed area, said system comprising:
    (a) reciprocating means movable to positions in communication with said essentially exposed and enclosed areas;
    (b) separate carriage means for each said component, each of said carriage means adapted to be alternately positioned on and carried by said reciprocating means for directly receiving the components in the exposed area and for carrying said components from said exposed area to said enclosed area;
    (c) track means mounted in said enclosed area along which said carriage means are adapted to travel;
    (d) drive means selectively and detachably coupled to said separate carriage means for sequentially moving said loaded carriage means along said track means from said reciprocating means to a mating area for substantial confluence of said carriage means thereat to thereby provide essential mating of said discrete components into a unitary weapon;
    (e) and means for moving said unitary weapon from said carriage means to a stowage area.

2. The system as defined according to claim 1 but further characterized by said essentially enclosed area being at a level different than the essentially exposed area, and further characterized by said reciprocating means comprising essentially vertically reciprocating elevator means.

3. A system as defined in claim 1 wherein each of said carriage means is further characterized by having lockable means thereupon to selectively secure said component to said cart.

4. A system as defined in claim 1 wherein said drive means comprises hydraulically operated means for moving said components relative to each other in an axial direction, thereby further effectuating mating.

5. A system as defined in claim 1 wherein said means for moving the mated weapon includes:
    (a) crane means, movable both vertically and horizontally;
    (b) securing means affixed to said crane means and selectively operable to lock said mated weapon to said crane means; and
    (c) power means for selectively actuating said securing means and said crane means, thereby locking said mated weapon to said crane means for selective movement in either a horizontal or vertical direction or both.

6. A system for handling and mating separate missile and booster components to form unitary weapons, each composed of one missile component and one booster component, said system comprising:
    (a) spaced, parallel handling and mating tracks upon which said missile and booster components are adapted to be moved;
    (b) an elevator with a platform thereon formed of a portion said tracks which aligns with, but is separate from the remainder of said tracks;

(c) hydraulically operated means to move said elevator transversely to said tracks between a first position where said elevator platform aligns with said tracks and a second position where said elevator platform aligns with a receiving station;

(d) hatch means normally closing said receiving station from said tracks;

(e) electrically controlled hydraulic power supply means to selectively open said hatch means when said elevator platform is moved to its second position;

(f) a missile cart, normally stored on said elevator platform, and thereby movable with said platform from its first position to its second position where a missile component loaded and locked onto said cart, then back to said first position, said interposition movement being controlled by said hydraulically operated means;

(g) drive means for engaging said loaded missile cart and moving it upon said tracks, from its position on said elevator to a mating station which is located near the end of said tracks which is farthest removed from said elevator;

(h) a booster cart, normally stored on said tracks adjacent said elevator on the side opposite said mating station side, said cart being movable, under control of said electrically controlled hydraulic power supply means, onto said elevator platform, thereby being movable with said elevator platform from its first position to its second position, where a booster component is loaded and locked onto said cart, then back to said first position, said interposition movement being controlled by said hydraulically operated means;

(i) drive means for engaging said loaded missile cart and moving it upon said tracks, from its position on said elevator to said mating station, adjacent the rear of said loaded missile cart;

(j) selectively operated mating means for moving said missile and booster components relative to each other, while still locked on their respective carts, to thereby lock said components together to form a unitary weapon;

(k) selectively operated release means on said carts to unlock said components from said carts after said components have been mated; and (l) crane means, having selectively operable locking means thereon, for locking onto said weapon and moving it to a storage station;

(m) said crane means being controlled by said electrically controlled hydraulic power supply means.

7. A system as defined in claim 6 but further characterized by a flametight door located between said elevator and said mating area and operated by said electrically controlled hydraulic power supply means.

8. A system as defined in claim 6 but further characterized by being fixedly mounted upon, and carried by a movable vehicle.

9. In a system for handling a plurality of components and mating said components together, the combination of:

(a) horizontal track means;

(b) a vertically reciprocable elevator having tracks selectively alignable with said track means;

(c) cart members, positionable on said elevator, for individual reception of said components;

(d) means for transferring said cart members, with the components thereon, onto said tracks, when said elevator is in alignment with said tracks;

(e) said means further transferring said cart members with the components thereon, along said tracks to the terminus thereof;

(f) power operated mating means, located adjacent the terminus of said tracks, and operable to move said components relative to one another and into locking engagement; and (g) crane means, located above the terminus of said tracks and movable both transversely and laterally thereto;

(h) said crane means including securing means for selective attachment to said mated components;

(i) whereby said mated components can be moved by said crane means, both transversely and laterally with respect to said tracks, thereby transferring said mated components from said tracks to a suitable reception point.

10. A vehicle carried component handling and mating system comprising:

(a) a plurality of carts with securing means thereon for receiving one component per cart and selectively securing it thereto;

(b) a hoist means for raising and lowering said carts between a component receiving level and a component transfer level;

(c) track means at said transfer level forming a mating station at one end thereof;

(d) said track means including an interrupted portion where said hoist means operates, thereby permitting alignment of said hoist means with said track means, when said hoist means is in its lowermost position;

(e) drive means for moving said carts from said hoist means and along said track means to said mating station, the rearwardmost of said carts locking into position therein;

(f) mating means, adjacent said mating station and selectively engageable with the forwardmost of said components for rearward movement thereof whereby, since said last cart is constrained against rearward motion, said components will telescopically lock upon one another thereby forming an integral unit; and (g) crane means for selectively attaching to said unit, when said unit is released from said carts, and for moving said unit laterally for deposit in a storage area.

11. A system as defined in claim 10 wherein hydraulic power is used as a source of motive power to operate system and electric power is used to operate controls for said hydraulic power.

12. A system for stowing multiple component weapons in the magazine of a naval vessel each of said weapons being initially received aboard said vessel as separate components in an essentially open deck area of the vessel, secondly at a protected receiving area, and thirdly at a mating area for said components, the mating area being separated from the protected receiving area by a flametight door, said system comprising:

(a) reciprocating means movable between said essentially open deck area and said protected receiving area;

(b) separate carriage means for each component and normally tandemly positioned in the protected receiving area of the vessel, each carriage means being alternately movable to a position for movement by said reciprocating means for carrying a component from said essentially open deck area to the protected receiving area;

(c) track means mounted between said protected receiving area and said mating area along which said carriage means are adapted to travel;

(d) drive means individually and detachably coupled to each of said carriage means to effectuate separate sequential movement of said carriage means along said track means from the protected area to the mating area, and vice versa, whereby the tandem confluence of said carriages in the mating area safeguarded by the flame-tight door operates to provide the essential mating of said components into a unitary weapon.

References Cited in the file of this patent

UNITED STATES PATENTS

| | | |
|---|---|---|
| 2,095,151 | O'Connor et al. | Oct. 5, 1937 |
| 2,396,143 | Andersen | Mar. 5, 1946 |
| 2,685,376 | Boyer | Aug. 3, 1954 |
| 2,820,642 | Harper | Jan. 21, 1958 |
| 2,984,157 | Johnstone | May 16, 1961 |
| 2,995,986 | Carlberg | Aug. 15, 1961 |
| 3,069,026 | Aluise et al. | Dec. 18, 1962 |
| 3,088,612 | Aluise et al. | May 7, 1963 |